United States Patent
Wang et al.

(10) Patent No.: US 11,044,733 B2
(45) Date of Patent: Jun. 22, 2021

(54) DEVICE-TO-DEVICE D2D COMMUNICATION METHOD AND RELATED DEVICE

(71) Applicant: HUAWEI TECHNOLOGIES CO., LTD., Shenzhen (CN)

(72) Inventors: Xudong Wang, Shanghai (CN); Aimin Tang, Shanghai (CN); Junchao Li, Shanghai (CN); Chi Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/658,498

(22) Filed: Oct. 21, 2019

(65) Prior Publication Data

US 2020/0053741 A1 Feb. 13, 2020

Related U.S. Application Data

(63) Continuation of application No. PCT/CN2018/083752, filed on Apr. 19, 2018.

(30) Foreign Application Priority Data

Apr. 22, 2017 (CN) .......................... 201710268113.3

(51) Int. Cl.
*H04W 72/08* (2009.01)
*H04W 72/04* (2009.01)
*H04L 5/00* (2006.01)

(52) U.S. Cl.
CPC ......... *H04W 72/085* (2013.01); *H04L 5/0048* (2013.01); *H04L 5/0053* (2013.01); *H04W 72/044* (2013.01)

(58) Field of Classification Search
CPC .. H04W 72/085; H04W 72/044; H04L 5/0048; H04L 5/0053
See application file for complete search history.

(56) References Cited

U.S. PATENT DOCUMENTS

2010/0261469 A1 10/2010 Ribeiro et al.
2013/0252654 A1 9/2013 Dimou et al.
(Continued)

FOREIGN PATENT DOCUMENTS

CN 102118868 A 7/2011
CN 102858012 A 1/2013
(Continued)

OTHER PUBLICATIONS

3GPP TR 36.877 V12.0.0 (Mar. 2015), 3rd Generation Partnership Project; Technical Specification Group Radio Access Network; LTE Device to Device (D2D) Proximity Services (ProSe); User Equipment (UE) radio transmission and reception(Release 12), Mar. 2015. total 40 pages.
(Continued)

*Primary Examiner* — Ronald B Abelson
(74) *Attorney, Agent, or Firm* — Hauptman Ham, LLP

(57) ABSTRACT

A device-to-device ("D2D") communication method includes sending first control signaling to first user equipment, sending second control signaling to second user equipment, and sending N pieces of third control signaling to N third user equipment. The method also includes receiving first channel quality feedback signaling fed back by the first user equipment, second channel quality feedback signaling fed back by the second user equipment, and receiving N pieces of third channel quality feedback signaling fed back by the N third user equipment. The method further includes detecting channel quality between the D2D user equipment and a base station, and determining a D2D communication mode based on the feedback signaling and
(Continued)

the channel quality between the D2D user equipment and the base station. The method additionally includes determining a D2D communication mode, and determining target third user equipment paired with the D2D user equipment based on the determined D2D communication mode.

12 Claims, 9 Drawing Sheets

(56) References Cited

U.S. PATENT DOCUMENTS

| | | | |
|---|---|---|---|
| 2013/0308490 A1 | 11/2013 | Lim et al. | |
| 2016/0381672 A1 | 12/2016 | Kim et al. | |

FOREIGN PATENT DOCUMENTS

| | | |
|---|---|---|
| CN | 103702346 A | 4/2014 |
| CN | 103974288 A | 8/2014 |
| CN | 104144507 A | 11/2014 |
| CN | 104303585 A | 1/2015 |
| CN | 104429141 A | 3/2015 |
| CN | 105554808 A | 5/2016 |
| EP | 3016302 A1 | 5/2016 |
| WO | 2012049351 A1 | 4/2012 |
| WO | 2014181175 A1 | 11/2014 |
| WO | 2016163972 A1 | 10/2016 |

OTHER PUBLICATIONS

3GPP TR 36.843 V12.01 (Mar. 2014), 3rd Generation Partnership Project;Technical Specification Group Radio Access Network;Study on LTE Device to Device Proximity Services;Radio Aspects(Release 12), Mar. 2014, total 50 pages.
International search report dated Jul. 9, 2018 from corresponding application No. PCT/CN2018/083752.
The extended European search report dated Nov. 29, 2019 from corresponding application No. EP 18787487.0.
European Office Action issued in corresponding European Patent Application No. 18787487.0, dated Mar. 15, 2021, pp. 1-5, European Patent Office, Munich, Germany.

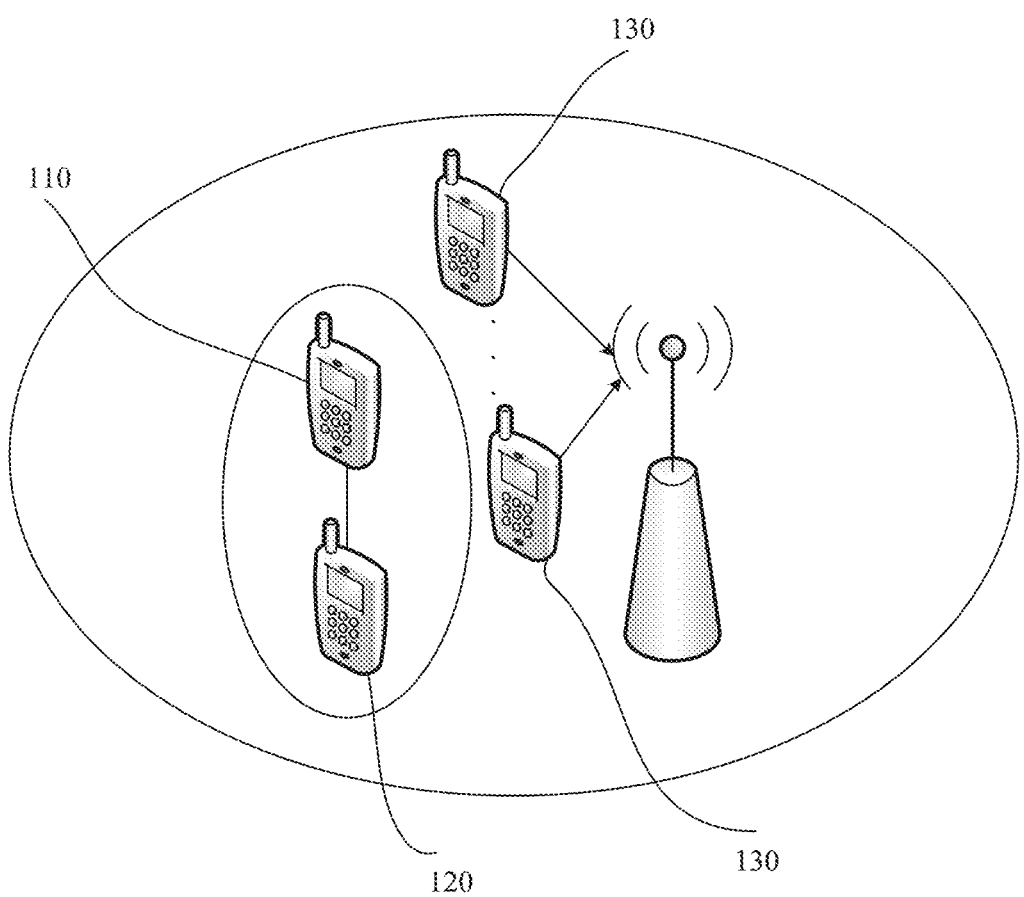
FIG. 1-a

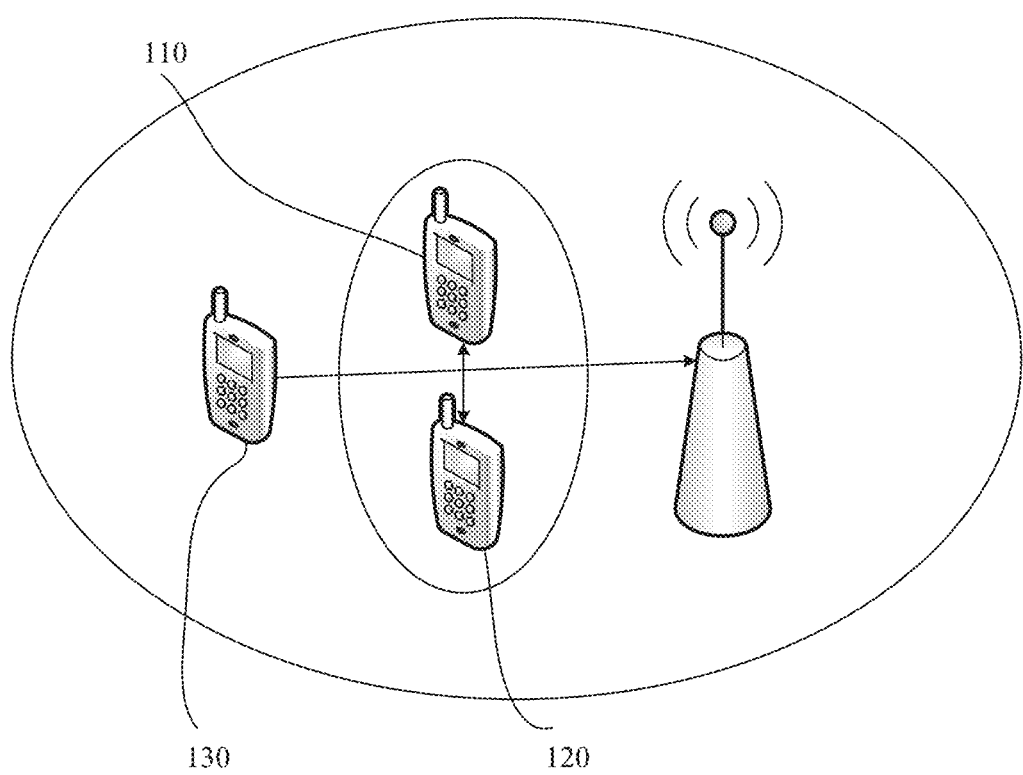
FIG. 1-b

DEVICE-TO-DEVICE D2D COMMUNICATION METHOD AND RELATED DEVICE

CROSS-REFERENCE TO RELATED APPLICATIONS

This application is a continuation of International Application No. PCT/CN2018/083752, filed on Apr. 19, 2018, which claims priority to Chinese Patent Application No. 201710268113.3, filed on Apr. 22, 2017. The disclosures of the aforementioned applications are hereby incorporated by reference in their entireties.

TECHNICAL FIELD

The present invention relates to the communications field, and specifically, to a device-to-device D2D communication method and a related device.

BACKGROUND

Device-to-device (D2D) communication is a new technology that allows, under control of a system, terminals to directly communicate with each other by multiplexing a cell resource. The device-to-device communication can be used to increase spectrum efficiency of a cellular communications system, reduce transmit powers of the terminals, and resolve a problem of spectrum resource scarcity in a wireless communications system to some extent.

An existing D2D communication mode includes a dedicated mode and a multiplexing mode. The multiplexing mode means that when a communication link of D2D user equipment is relatively far away from an uplink user in a cell, and the uplink user in the cell causes relatively weak interference or no interference to the communication of the D2D user equipment, communication of the uplink user in the cell and the communication of the D2D user equipment multiplex a same time-frequency resource to fully multiplex a spectrum resource. The dedicated mode means that when a communication link of D2D user equipment is relatively close to an uplink user in a cell, because the user in the cell causes relatively strong interference to the D2D communication link, the D2D communication and the uplink user in the cell perform communication by using an orthogonal time-frequency resource. Consequently, frequency resource utilization is low in the dedicated mode.

SUMMARY

Embodiments of the present invention provide a device-to-device D2D communication method and a related device, to improve time-frequency resource utilization during D2D communication.

According to a first aspect, an embodiment of the present invention provides a device-to-device D2D communication method. When second user equipment sends data to first user equipment, the method includes:

sending, by a base station, first control signaling to the first user equipment, sending second control signaling to the second user equipment, and sending N pieces of third control signaling to N third user equipments, where the first user equipment and the second user equipment are D2D user equipments, and the third user equipment is user equipment in a cell; the first control signaling is used to instruct the first user equipment to detect channel quality between the second user equipment and the first user equipment, the second control signaling is used to instruct the second user equipment to detect channel quality between the first user equipment and the second user equipment, and the third control signaling is used to instruct the third user equipment to detect channel quality between the D2D user equipment and the third user equipment; and N is a positive integer;

receiving, by the base station, first channel quality feedback signaling fed back by the first user equipment, receiving second channel quality feedback signaling fed back by the second user equipment, and receiving N pieces of third channel quality feedback signaling fed back by the N third user equipments, where the first channel quality feedback signaling is used to indicate the channel quality between the second user equipment and the first user equipment, the second channel quality feedback signaling is used to indicate the channel quality between the first user equipment and the second user equipment, and the third channel quality feedback signaling is used to indicate the channel quality between the D2D user equipment and the third user equipment;

detecting, by the base station, channel quality between the D2D user equipment and the base station;

determining, by the base station, a D2D communication mode based on the first channel quality feedback signaling, the second channel quality feedback signaling, the third channel quality feedback signaling, and the channel quality between the D2D user equipment and the base station, where the D2D communication mode includes a dedicated mode, a common multiplexing mode, and a collaborative multiplexing mode; and if the D2D communication mode includes the common multiplexing mode and the collaborative multiplexing mode, determining, by the base station based on the first channel quality feedback signaling, the second channel quality feedback signaling, the third channel quality feedback signaling, and the channel quality between the D2D user equipment and the base station, target third user equipment paired with the D2D user equipment.

In a possible design, the first control signaling includes a first sounding signal sending command, a time-frequency resource allocated by the base station to the first user equipment for sending a first sounding signal, a first sounding signal receiving command, and a time-frequency resource allocated by the base station to the second user equipment for sending a second sounding signal. The first sounding signal sending command is used to instruct the first user equipment to send the first sounding signal on the time-frequency resource allocated by the base station to the first user equipment for sending the first sounding signal. The first sounding signal receiving command is used to instruct the first user equipment to detect, on the time-frequency resource on which the second user equipment sends the second sounding signal, signal quality of the second sounding signal sent by the second user equipment. Therefore, the first user equipment can detect, based on the first control signaling, the signal quality of the second sounding signal sent by the second user equipment.

In a possible design, the second control signaling includes a second sounding signal sending command, a time-frequency resource allocated by the base station to the second user equipment for sending a second sounding signal, a second sounding signal receiving command, and a time-frequency resource allocated by the base station to the first user equipment for sending a first sounding signal. The second sounding signal sending command is used to instruct the second user equipment to send the second sounding signal on the time-frequency resource allocated by the base station to the second user equipment for sending the second sounding signal. The second sounding signal receiving command is used to instruct the second user equipment to detect, on the time-frequency resource on which the first user equipment sends the first sounding signal, signal quality of the first sounding signal sent by the first user equipment. Therefore, the second user equipment can detect, based on the second control signaling, the signal quality of the first sounding signal sent by the first user equipment.

In a possible design, the third control signaling includes a third sounding signal receiving command and time-frequency resources allocated by the base station to the first user equipment and the second user equipment. The third sounding signal receiving command is used to instruct the target third user equipment to detect, on a time-frequency resource of the first user equipment, signal quality of a first sounding signal sent by the first user equipment, and to detect, on a time-frequency resource of the second user equipment, signal quality of a second sounding signal sent by the second user equipment. Therefore, the third user equipment can detect, based on the third control signaling, signal quality of the sounding signals sent by the first user equipment and the second user equipment.

In a possible design, if the D2D communication mode includes the common multiplexing mode and the collaborative multiplexing mode, the method further includes: sending, by the base station, fourth control signaling to the first user equipment, so that the first user equipment performs communication based on the fourth control signaling; sending fifth control signaling to the second user equipment, so that the second user equipment performs communication based on the fifth control signaling; and sending sixth control signaling to the target third user equipment, so that the target third user equipment performs communication based on the sixth control signaling. The fourth control signaling includes the D2D communication mode determined by the base station, a time-frequency resource allocated by the base station to the first user equipment for receiving and forwarding data, and a transmit power and a modulation and coding scheme that are used when the first user equipment forwards data. The fifth control signaling includes the D2D communication mode determined by the base station, a time-frequency resource allocated by the base station to the second user equipment for sending data, and a transmit power and a modulation and coding scheme that are of the second user equipment. The sixth control signaling includes a time-frequency resource allocated by the base station to the target third user equipment for sending data and a transmit power and a modulation and coding scheme that are of the target third user equipment. Therefore, each user equipment can perform communication based on control signaling sent by the base station.

According to a second aspect, an embodiment of the present invention provides a device-to-device D2D communication method. When second user equipment sends data to first user equipment, the method includes: receiving, by the first user equipment, first control signaling sent by a base station, where the first control signaling is used to instruct the first user equipment to detect channel quality between the second user equipment and the first user equipment, and the first user equipment and the second user equipment are D2D user equipments; receiving, by the first user equipment based on the first control signaling, a second sounding signal sent by the second user equipment, so that the first user equipment detects and obtains the channel quality between the second user equipment and the first user equipment, based on the second sounding signal; and sending first channel quality feedback signaling to the base station, where the first channel quality feedback signaling is used to indicate the channel quality between the second user equipment and the first user equipment.

In a possible design, if the D2D communication mode includes a dedicated mode, a common multiplexing mode, and a collaborative multiplexing mode, the method further includes: receiving, by the first user equipment, fourth control signaling sent by the base station, where the fourth control signaling includes a D2D communication mode determined by the base station, a time-frequency resource allocated by the base station to the first user equipment for receiving and forwarding data, and a transmit power and a modulation and coding scheme that are used when the first user equipment forwards data; and performing, by the first user equipment, communication based on the fourth control signaling. Therefore, the first user equipment can perform communication based on the fourth control signaling.

According to a third aspect, an embodiment of the present invention provides a device-to-device D2D communication method. When second user equipment sends data to first user equipment, the method includes: receiving, by the second user equipment, second control signaling sent by a base station, where the second control signaling is used to instruct the second user equipment to detect channel quality between the first user equipment and the second user equipment, and the first user equipment and the second user equipment are D2D user equipments; receiving, by the second user equipment based on the second control signaling, a first sounding signal sent by the first user equipment, so that the second user equipment detects and obtains the channel quality between the first user equipment and the second user equipment, based on the first sounding signal; and sending second channel quality feedback signaling to the base station, where the second channel quality feedback signaling is used to indicate the channel quality between the first user equipment and the second user equipment.

In a possible design, if the D2D communication mode includes a dedicated mode, a common multiplexing mode, and a collaborative multiplexing mode, the method further includes: receiving, by the second user equipment, fifth control signaling sent by the base station, where the fifth control signaling includes a D2D communication mode determined by the base station, a time-frequency resource allocated by the base station to the second user equipment for sending data, and a transmit power and a modulation and coding scheme that are of the second user equipment; and performing, by the second user equipment, communication based on the fifth control signaling. Therefore, the second user equipment can perform communication based on the fifth control signaling.

According to a fourth aspect, an embodiment of the present invention provides a device-to-device D2D communication method. The method includes: receiving, by third user equipment, third control signaling sent by a base station, where the third user equipment is user equipment in a cell, and the third control signaling is used to instruct the third user equipment to detect channel quality between D2D user equipment and the third user equipment; receiving, by the third user equipment based on the third control signaling, a first sounding signal sent by first user equipment and a second sounding signal sent by second user equipment, so that the third user equipment detects and obtains the channel quality between the D2D user equipment and the third user equipment, based on the first sounding signal and the second sounding signal; and sending third channel quality feedback signaling to the base station, where the third channel quality feedback signaling is used to indicate the channel quality between the D2D device and the third user equipment.

In a possible design, if the D2D communication mode includes a common multiplexing mode and a collaborative multiplexing mode, the method further includes: receiving, by the third user equipment, sixth control signaling sent by the base station, where the sixth control signaling includes a time-frequency resource allocated by the base station to the third user equipment for sending data and a transmit power and a modulation and coding scheme that are of the third user equipment; and performing, by the third user equipment, communication based on the sixth control signaling. Therefore, the third user equipment can perform communication based on the sixth control signaling.

According to a fifth aspect, an embodiment of the present invention provides a base station. The base station has a function of implementing the first aspect. The function may be implemented by hardware, or may be implemented by hardware executing corresponding software. The hardware or software includes one or more modules corresponding to the function.

According to a sixth aspect, an embodiment of the present invention provides first user equipment. The first user equipment has a function of implementing the second aspect. The function may be implemented by hardware, or may be implemented by hardware executing corresponding software. The hardware or software includes one or more modules corresponding to the function.

According to a seventh aspect, an embodiment of the present invention provides second user equipment. The second user equipment has a function of implementing the third aspect. The function may be implemented by hardware, or may be implemented by hardware executing corresponding software. The hardware or software includes one or more modules corresponding to the function.

According to an eighth aspect, an embodiment of the present invention provides third user equipment. The third user equipment has a function of implementing the fourth aspect. The function may be implemented by hardware, or may be implemented by hardware executing corresponding software. The hardware or software includes one or more modules corresponding to the function.

According to a ninth aspect, an embodiment of the present invention provides a computer readable storage medium, configured to store a computer software instruction used by the base station described in the fifth aspect. The computer software instruction includes a program designed for performing the foregoing aspect.

According to a tenth aspect, an embodiment of the present invention provides a computer readable storage medium, configured to store a computer software instruction used by the first user equipment described in the sixth aspect. The computer software instruction includes a program designed for performing the foregoing aspect.

According to an eleventh aspect, an embodiment of the present invention provides a computer readable storage medium, configured to store a computer software instruction used by the second user equipment described in the seventh aspect. The computer software instruction includes a program designed for performing the foregoing aspect.

According to a twelfth aspect, an embodiment of the present invention provides a computer readable storage medium, configured to store a computer software instruction used by the third user equipment described in the eighth aspect. The computer software instruction includes a program designed for performing the foregoing aspect.

Compared with the prior art, in the solutions provided in the embodiments of the present invention, the base station sends control signaling to the D2D user equipment and the third user equipment. Then, the first user equipment feeds back, to the base station, the channel quality between the second user equipment and the first user equipment, the second user equipment feeds back, to the base station, the channel quality between the first user equipment and the second user equipment, and the third user equipment feeds back, to the base station, channel quality between the base station and the third user equipment and the channel quality between the D2D user equipment and the third user equipment. Then, the base station determines the D2D communication mode based on channel quality fed back by each user equipment. The D2D communication mode includes the dedicated mode, the common multiplexing mode, and the collaborative multiplexing mode. Therefore, when a D2D communication link is relatively close to the third user equipment, the collaborative multiplexing mode can be selected for D2D communication, to improve time-frequency resource utilization.

BRIEF DESCRIPTION OF DRAWINGS

To describe the technical solutions in the embodiments of the present invention more clearly, the following briefly describes the accompanying drawings required for describing the embodiments.

FIG. 1-*a* is a schematic architectural diagram of a device-to-device D2D communications system 100 according to an embodiment of the present invention;

FIG. 1-*b* is a schematic diagram of a device-to-device D2D communication model according to an embodiment of the present invention;

DESCRIPTION OF EMBODIMENTS

Figure 2A:
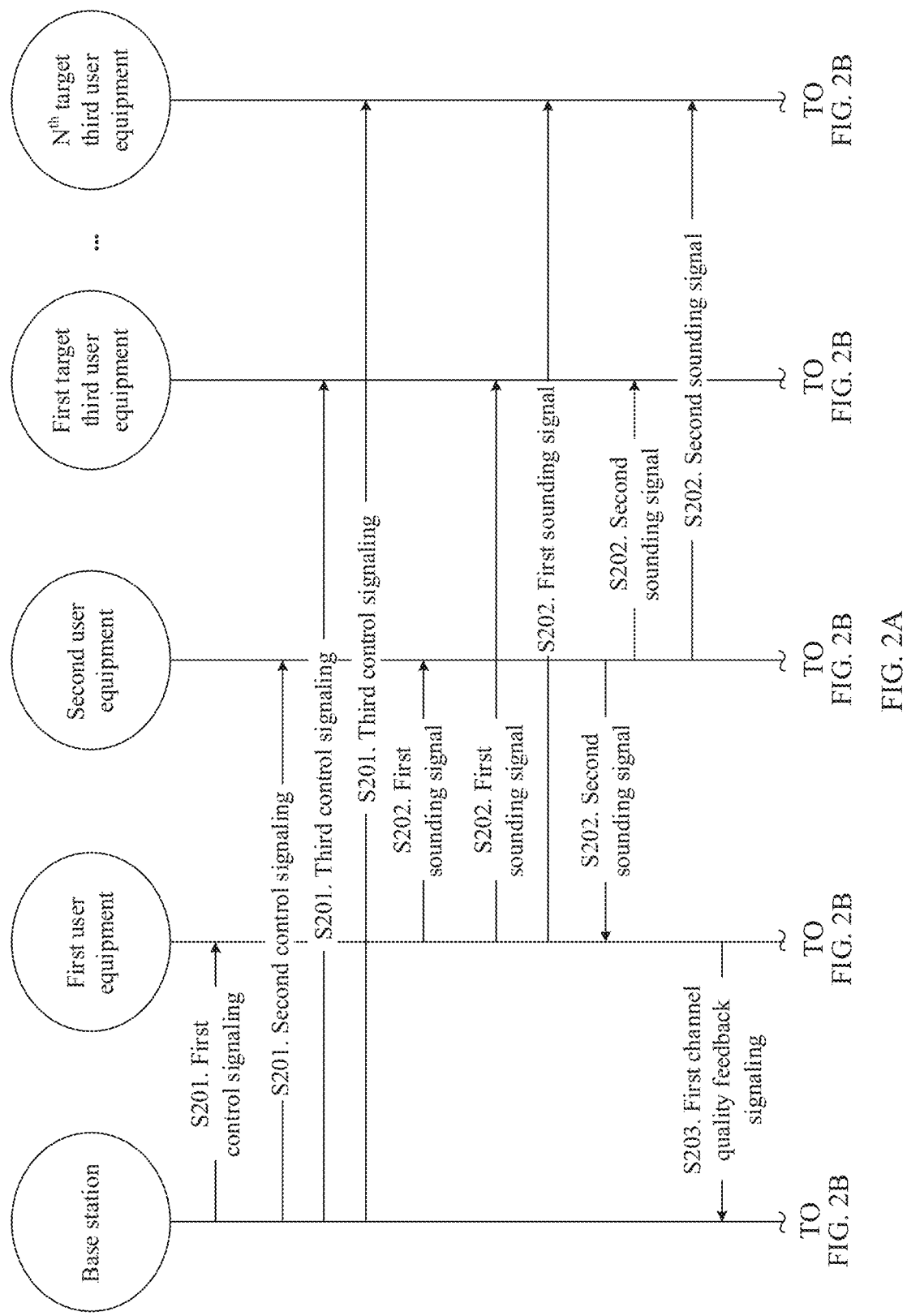
FIG. 2A and FIG. 2B are a schematic flowchart of a device-to-device D2D communication method according to an embodiment of the present invention.

To make persons skilled in the art understand the solutions in the present invention better, the following clearly describes the technical solutions in the embodiments of the present invention with reference to the accompanying drawings in the embodiments of the present invention.

FIG. 1-*a* is a schematic architectural diagram of a device-to-device D2D communications system 100 according to an embodiment of the present invention. As shown in FIG. 1-*a*, the D2D communications system 100 is applied to a 4th generation mobile communication technology (4G) or 5th generation mobile communication technology (5G) cellular network system. The D2D communications system 100 includes a base station 110, first user equipment 120 and second user equipment 130 that are configured to perform device-to-device D2D communication, and N uplink user equipments in a cell, namely, third user equipment 140. The first user equipment 120 may be a device that can perform wireless communication, for example, a mobile phone, a wearable device, and a tablet computer. The second user equipment 130 may also be a device that can perform wireless communication, for example, a mobile phone, a wearable device, and a tablet computer. The third user equipment 140 may also be a device that can perform wireless communication, for example, a mobile phone, a wearable device, and a tablet computer. In the D2D communications system 100, the base station 110 can select different communication modes based on a distance between the D2D user equipment and the third user equipment 140, to implement an optimal D2D communication mode. For details, refer to FIG. 1-*b*. FIG. 1-*b* is a schematic diagram of a device-to-device D2D communication model according to an embodiment of the present invention.

In this embodiment of the present invention, when the D2D communications system 100 works, only the second user equipment 130 may send data to the first user equipment 120, or the first user equipment 120 may send data to the second user equipment 130 when the second user equipment 130 sends data to the first user equipment 120.

Figure 2B:
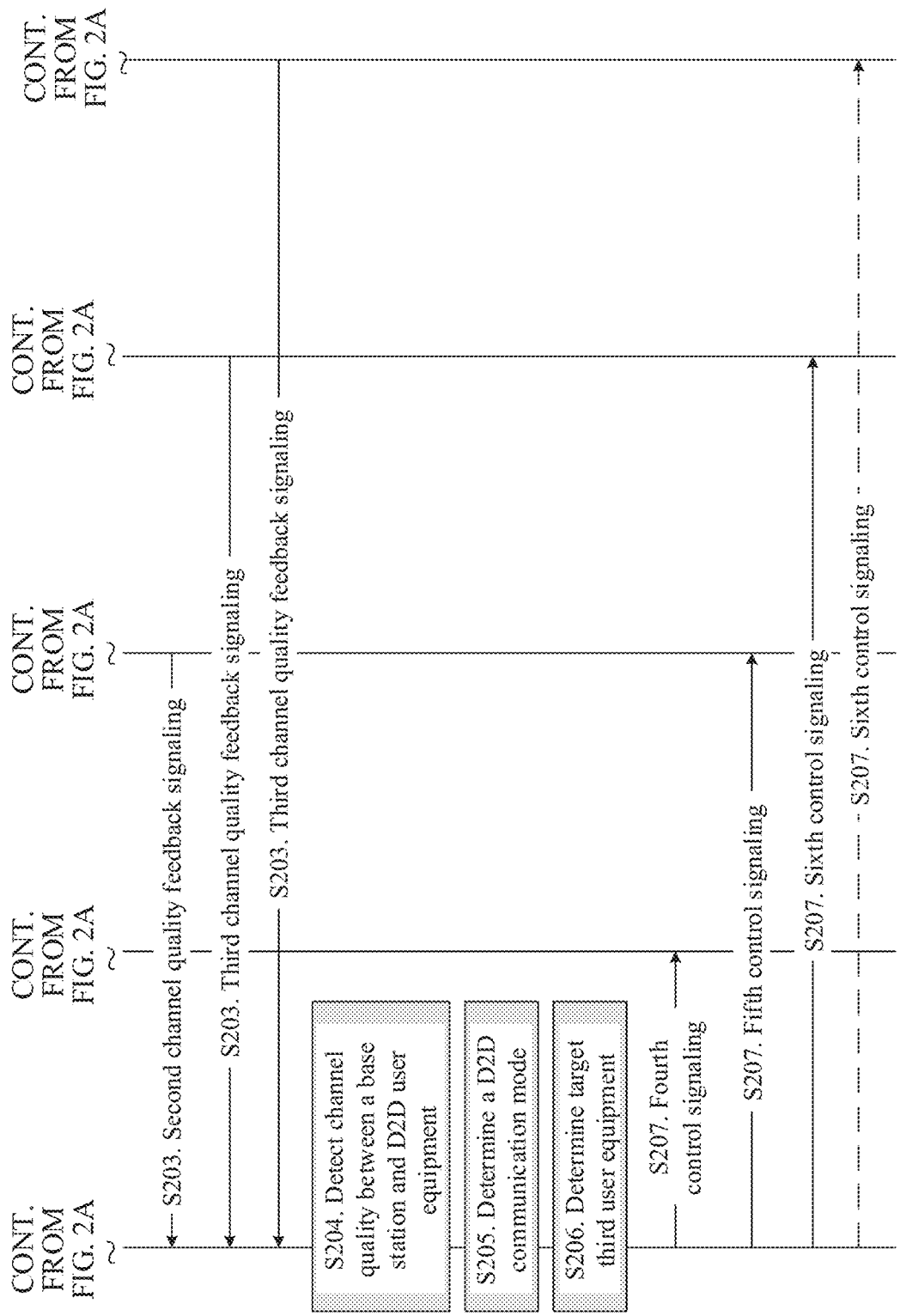

The following describes an embodiment of the present invention in detail. First, refer to FIG. 2A and FIG. 2B. FIG. 2A and FIG. 2B are a schematic flowchart of a device-to-device D2D communication method according to an embodiment of the present invention. As shown in FIG. 2A and FIG. 2B, the method may include the following steps.

S201. When second user equipment sends data to first user equipment, a base station sends first control signaling to the first user equipment, sends second control signaling to the second user equipment, and sends N pieces of third control signaling to N third user equipments. In this case, the first user equipment receives the first control signaling sent by the base station, the second user equipment receives the second control signaling sent by the base station, and the third user equipment receives the third control signaling sent by the base station.

Herein, N is a positive integer.

The first user equipment and the second user equipment are D2D user equipments. The third user equipment is user equipment in a cell. The first control signaling is used to instruct the first user equipment to detect channel quality between the second user equipment and the first user equipment. The second control signaling is used to instruct the second user equipment to detect channel quality between the first user equipment and the second user equipment. The third control signaling is used to instruct the third user equipment to detect channel quality between the D2D user equipment and the third user equipment.

Optionally, in an embodiment of the present invention, when the base station detects that the first user equipment and the second user equipment have a D2D communication requirement that the second user equipment sends data to the first user equipment in a cell, the base station sends the first control signaling to the first user equipment, sends the second control signaling to the second user equipment, and sends the third control signaling to each of the N third user equipments in the cell.

Optionally, in an embodiment of the present invention, the first control signaling includes a first sounding signal sending command, a time-frequency resource allocated by the base station to the first user equipment for sending a first sounding signal, a first sounding signal receiving command, and a time-frequency resource allocated by the base station to the second user equipment for sending a second sounding signal. The first sounding signal sending command is used to instruct the first user equipment to send the first sounding signal on the time-frequency resource allocated by the base station to the first user equipment for sending the first sounding signal. The first sounding signal receiving command is used to instruct the first user equipment to detect, on the time-frequency resource on which the second user equipment sends the second sounding signal, signal quality of the second sounding signal sent by the second user equipment. Therefore, the first user equipment can detect, based on the first control signaling, the signal quality of the second sounding signal sent by the second user equipment.

Optionally, in an embodiment of the present invention, the second control signaling includes a second sounding signal sending command, a time-frequency resource allocated by the base station to the second user equipment for sending a second sounding signal, a second sounding signal receiving command, and a time-frequency resource allocated by the base station to the first user equipment for sending a first sounding signal. The second sounding signal sending command is used to instruct the second user equipment to send the second sounding signal on the time-frequency resource allocated by the base station to the second user equipment for sending the second sounding signal. The second sounding signal receiving command is used to instruct the second user equipment to detect, on the time-frequency resource on which the first user equipment sends the first sounding signal, signal quality of the first sounding signal sent by the first user equipment. Therefore, the second user equipment can detect, based on the second control signaling, the signal quality of the first sounding signal sent by the first user equipment.

Optionally, in an embodiment of the present invention, the third control signaling includes a third sounding signal receiving command and time-frequency resources allocated by the base station to the first user equipment and the second user equipment. The third sounding signal receiving command is used to instruct the third user equipment to detect, on a time-frequency resource of the first user equipment, signal quality of a first sounding signal sent by the first user equipment, and to detect, on a time-frequency resource of the second user equipment, signal quality of a second sounding signal sent by the second user equipment. Therefore, the third user equipment can detect, based on the third control signaling, signal quality of the sounding signals sent by the first user equipment and the second user equipment.

S202. The first user equipment receives, based on the first control signaling, a second sounding signal sent by the second user equipment, the second user equipment receives, based on the second control signaling, a first sounding signal sent by the first user equipment, and the third user equipment receives, based on the third control signaling, the first sounding signal sent by the first user equipment and the second sounding signal sent by the second user equipment.

In this embodiment of the present invention, after the first user equipment receives the second sounding signal, the first user equipment obtains the channel quality between the second user equipment and the first user equipment, and then sends the channel quality to the base station by using first channel quality feedback signaling.

In this embodiment of the present invention, after the second user equipment receives the first sounding signal, the second user equipment obtains the channel quality between the first user equipment and the second user equipment, and then sends the channel quality to the base station by using second channel quality feedback signaling.

In this embodiment of the present invention, after the third user equipment receives the first sounding signal and the second sounding signal, the third user equipment obtains the channel quality between the D2D user equipment and the third user equipment, and then sends the channel quality to the base station by using third channel quality feedback signaling.

S203. The first user equipment sends first channel quality feedback signaling to the base station, the second user equipment sends second channel quality feedback signaling to the base station, and the third user equipment sends third channel quality feedback signaling to the base station. In this case, the base station receives the first channel quality feedback signaling fed back by the first user equipment, the base station receives the second channel quality feedback signaling fed back by the second user equipment, and the base station receives the third channel quality feedback signaling fed back by the third user equipment.

The first channel quality feedback signaling is used to indicate the channel quality between the second user equipment and the first user equipment, the second channel quality feedback signaling is used to indicate the channel quality between the first user equipment and the second user equipment, and the third channel quality feedback signaling is used to indicate the channel quality between the D2D user equipment and the third user equipment.

S204. The base station detects channel quality between D2D user equipment and the base station.

Specifically, in an embodiment of the present invention, the base station may receive a sounding signal sent by the D2D user equipment, to detect the channel quality between the D2D user equipment and the base station by using the sounding signal.

S205. The base station determines a D2D communication mode based on the first channel quality feedback signaling, the second channel quality feedback signaling, the third channel quality feedback signaling, and the channel quality between the D2D user equipment and the base station.

The D2D communication mode includes a dedicated mode, a common multiplexing mode, and a collaborative multiplexing mode.

The dedicated mode means that when the D2D user equipment is relatively close to the third user equipment, but quality of a signal between the D2D user equipments is not very good or the D2D user equipment is relatively far away from the base station, a D2D communication link and a communication link of the third user equipment use an orthogonal time-frequency resource allocation manner, to avoid interference between the D2D communication link and the third user equipment. However, in this case, time-frequency resource utilization efficiency is also reduced.

The common multiplexing mode means that when a D2D communication link is relatively far away from the third user equipment, there is no communication interference between the D2D communication link and the third user equipment. Therefore, a same time-frequency resource may be multiplexed for communication. In other words, the common multiplexing mode corresponds to a multiplexing mode in two D2D communication modes in the prior art.

The collaborative multiplexing mode means that a D2D communication link is relatively close to the third user equipment, the D2D user equipments are relatively close to each other, and the D2D user equipment is relatively close to the base station, so that quality of a signal between the D2D user equipments is relatively good. To improve time-frequency resource utilization efficiency, in a first slot, the third user equipment sends data to the first user equipment when the second user equipment sends data to the first user equipment. In this case, a transmit power of the second user equipment is controlled to be greater than a transmit power of the third user equipment. In a second slot, if the first user equipment sends no data to the second user equipment, the first user equipment forwards data of the third user equipment to the base station. Alternatively, if the first user equipment sends data to the second user equipment, the first user equipment superposes data sent to the base station and data sent to the second user equipment, then sends the superposed data, and controls a power, so that during superposition, a power of the data sent to the base station is greater than a power of the data sent to the second user equipment. In the first slot, during decoding, the first user equipment first uses the data sent by the third user equipment to the first user equipment as noise to decode the data sent by the second user equipment to the first user equipment, and then eliminates, by using SIC technology, the data sent by the second user equipment to decode the data sent by the third user equipment. In the second slot, if the first user equipment sends no data to the second user equipment, the base station directly decodes the data that is of the third user equipment and that is forwarded by the first user equipment. If the first user equipment sends data to the second user equipment, the base station uses, during decoding, the data sent to the second user equipment as noise. The second user equipment first uses the data sent to the second user equipment as the noise to decode the data that is of the third user equipment and that is forwarded by the first user equipment, and then decodes, after eliminating the data, the data sent by the first user equipment to the second user equipment. In the foregoing solution, a plurality of pieces of data can be simultaneously sent, to improve resource utilization.

Optionally, in an embodiment of the present invention, when the D2D communication mode determined by the base station is the dedicated mode, the base station may directly send fourth control signaling to the first user equipment, and send fifth control signaling to the second user equipment, so that the first user equipment and the second user equipment perform D2D communication.

Optionally, in another embodiment of the present invention, when the D2D communication mode determined by the base station is the common multiplexing mode or the collaborative multiplexing communication mode, because the D2D user equipment and another uplink user equipment need to share a time-frequency resource in the two modes, target third user equipment paired with the D2D user equipment needs to be determined from the N third user equipments in the cell. In this case, the base station needs to further determine the target third user equipment paired with the D2D user equipment.

In this embodiment of the present invention, because different D2D communication modes are determined based on strength of signal interference between the D2D communication link and the third user equipment, the base station may determine, based on the first channel quality feedback signaling, the second channel quality feedback signaling, the third channel quality feedback signaling, and the channel quality between the D2D user equipment and the base station, a D2D communication mode selected by the base station.

S206. If the D2D communication mode includes a multiplexing mode and a collaborative multiplexing mode, the base station determines, based on the first channel quality feedback signaling, the second channel quality feedback signaling, the third channel quality feedback signaling, and the channel quality between the D2D user equipment and the base station, target third user equipment paired with the D2D user equipment.

Optionally, in an embodiment of the present invention, if the D2D communication mode works in a half-duplex mode, the base station determines, based on the first channel quality feedback signaling, the second channel quality feedback signaling, the third channel quality feedback signaling, and the channel quality between the D2D user equipment and the base station, target third user equipment paired with the D2D user equipment.

Optionally, in another embodiment of the present invention, if the D2D communication mode works in a full-duplex mode, the base station determines, based on the first channel quality feedback signaling, the second channel quality feedback signaling, the third channel quality feedback signaling, and the channel quality between the D2D user equipment and the base station, two target third user equipments paired with the D2D user equipment.

It may be understood that because selected target third user equipment and the D2D user equipment need to use a same time-frequency resource, channel quality between the target third user equipment and the D2D user equipment needs to be good. Therefore, the base station determines, based on the third channel quality feedback signaling and the channel quality between the D2D user equipment and the base station, the target third user equipment paired with the D2D user equipment.

S207. When the D2D communication mode is the collaborative multiplexing mode, the base station sends fourth control signaling to the first user equipment, the base station sends fifth control signaling to the second user equipment, and the base station sends sixth control signaling to the target third user equipment, so that the first user equipment receives the fourth control signaling sent by the base station, the second user equipment receives the fifth control signaling sent by the base station, and the third user equipment receives the sixth control signaling sent by the base station.

Optionally, in another embodiment of the present invention, if the D2D communication mode determined by the base station is the dedicated mode, because time-frequency resources of the D2D user equipment and uplink user equipment do not interfere with each other in the dedicated mode, in this case, the base station only needs to send the fourth control signaling to the first user equipment, and send the fifth control signaling to second user equipment. Then, the first user equipment and the second user equipment can perform D2D communication based on the fourth control signaling and the fifth control signaling.

Optionally, in another embodiment of the present invention, if the D2D communication mode determined by the base station is the common multiplexing mode or the collaborative multiplexing mode, because the D2D user equipment and uplink user equipment share a same time-frequency resource in the common multiplexing mode or the collaborative multiplexing mode, the base station needs to send the fourth control signaling to the first user equipment, send the fifth control signaling to the second user equipment, and send the sixth control signaling to the third user equipment at the same time.

Specifically, in an embodiment of the present invention, when only the second user equipment sends data to the first user equipment, and the D2D communication mode is the dedicated mode or the common multiplexing mode, the fourth control signaling includes a selected D2D communication mode and a time-frequency resource allocated by the base station to the first user equipment for receiving data.

Optionally, in another embodiment of the present invention, when the first user equipment also sends data to the second user equipment when the second user equipment sends data to the first user equipment, and the D2D communication mode is the dedicated mode or the common multiplexing mode, in addition to a selected D2D communication mode and a time-frequency resource allocated by the base station to the first user equipment for receiving data, the fourth control signaling includes a time-frequency resource allocated to the first user equipment for sending data and a transmit power and a modulation and coding scheme that are of the first user equipment.

Specifically, in an embodiment of the present invention, when only the second user equipment sends data to the first user equipment, and the D2D communication mode is the collaborative multiplexing communication mode, the fourth control signaling includes a selected D2D communication mode, a time-frequency resource allocated by the base station to the first user equipment for receiving and forwarding data, and a transmit power and a modulation and coding scheme that are used when the first user equipment forwards data, so that after receiving the fourth control signaling, the first user equipment can perform communication based on the fourth control signaling.

Optionally, in another embodiment of the present invention, when the first user equipment also sends data to the second user equipment when the second user equipment sends data to the first user equipment, and the D2D communication mode is the collaborative multiplexing communication mode, in addition to a selected D2D communication mode, a time-frequency resource allocated by the base station to the first user equipment for receiving and forwarding data, and a transmit power and a modulation and coding scheme that are used when the first user equipment forwards data, the fourth control signaling includes a transmit power and a modulation and coding scheme that are used when the first user equipment sends data to the second user equipment, and a data superposition manner used when the first user equipment forwards data of the third user equipment and sends data to the second user equipment. The fourth control signaling includes the data superposition manner used when the first user equipment forwards the data of the third user equipment and sends the data to the second user equipment, so that after receiving the fourth control signaling, the first user equipment can perform communication in the collaborative multiplexing communication mode.

Specifically, in an embodiment of the present invention, when the second user equipment sends data to the first user equipment, regardless of which D2D communication mode, the fifth control signaling includes the D2D communication mode determined by the base station, a time-frequency resource allocated by the base station to the second user equipment for sending data, and a transmit power and a modulation and coding scheme that are of the second user equipment.

Optionally, in another embodiment of the present invention, when the first user equipment also sends data to the second user equipment when the second user equipment sends data to the first user equipment, in addition to the D2D communication mode determined by the base station, a time-frequency resource allocated by the base station to the second user equipment for sending data, and a transmit power and a modulation and coding scheme that are of the second user equipment, the fifth control signaling includes a time-frequency resource allocated by the base station to the second user for receiving data.

Specifically, in an embodiment of the present invention, the sixth control signaling includes a time-frequency resource allocated by the base station to the third user equipment for sending data and a transmit power and a modulation and coding scheme that are of the third user equipment.

S208. The first user equipment performs communication based on the fourth control signaling, the second user equipment performs communication based on the fifth control signaling, and the third user equipment performs communication based on the sixth control signaling.

In this embodiment of the present invention, after the base station allocates the D2D communication mode, the transmit power, the time-frequency resource, and the modulation and coding scheme by using the fourth control signaling, the fifth control signaling, and the sixth control signaling, the first user equipment, the second user equipment, and the third user equipment can perform communication based on the foregoing information.

Figure 3:
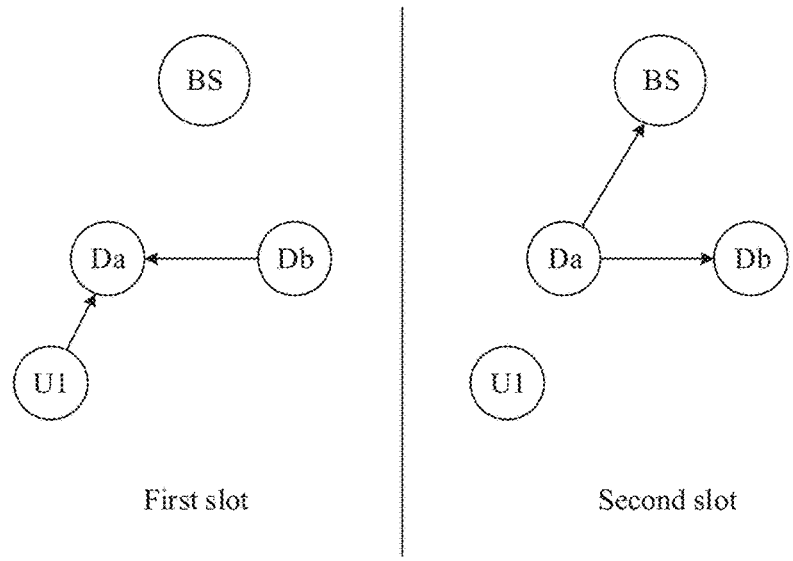
FIG. 3 is a schematic diagram of working in a D2D collaborative multiplexing communication mode according to an embodiment of the present invention.

Specifically, in an embodiment of the present invention, in a half-duplex mode, a communication process of the collaborative multiplexing communication mode is completed in two slots. FIG. 3 is a schematic diagram of working in a D2D collaborative multiplexing communication mode according to an embodiment of the present invention. In FIG. 3, Da and Db respectively represent first user equipment and second user equipment that perform D2D communication, U1 represents third user equipment paired with D2D user equipment, and BS represents a base station. In a first slot, the third user equipment U1 sends data to the neighboring first user equipment Da, and the second user equipment Db also sends data to the first user equipment Da at the same time. The base station controls a power of the data sent by the second user equipment Db and a power of the data sent by the third user equipment U1, so that a signal power of the second user equipment Db is greater than a signal power of the third user equipment U1. Then, after the first user equipment Da receives the data sent by the second user equipment Db and the data sent by the third user equipment U1, the first user equipment Da first considers the data of the third user equipment U1 as noise to decode the data of the second user equipment Db, and then decodes the data of the third user equipment U1 by using a successive interference cancellation (SIC) technology. In a second slot, the first user equipment Da separately simultaneously sends the data of the third user equipment U1 to the base station BS and data of the first user equipment Da to the second user equipment Db by using different powers. A relatively high power is allocated to the data of the third user equipment U1, and a relatively low power is used for the data sent to the second user equipment Db. Then, after the base station BS receives the data, the base station BS uses a signal sent to the second user equipment Db as noise to directly decode the data of the third user equipment U1. The second user equipment Db first decodes the data of the third user equipment U1, and then decodes, by using the SIC technology, data sent by the first user equipment Da to the second user equipment Db. Optionally, if the second user equipment Db sends no data to the first user equipment Da, the first user equipment Da directly forwards the data of the third user equipment U1 to the base station BS in this case, so that the D2D user equipment and uplink user equipment use a same time-frequency resource for collaborative communication in the half-duplex mode.

Figure 4:
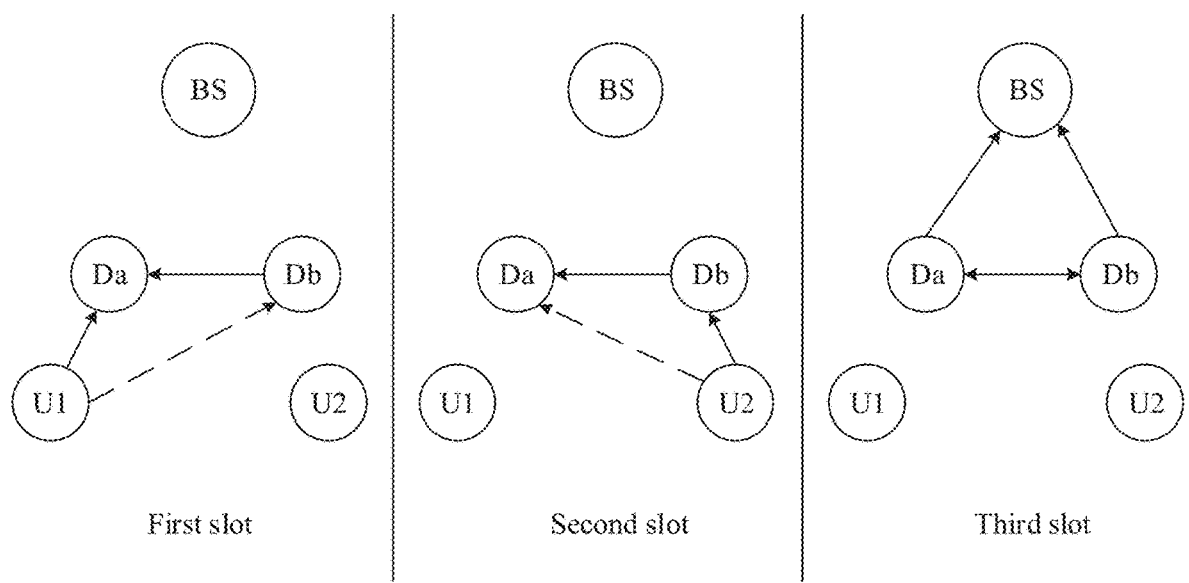
FIG. 4 is a schematic diagram of working in another D2D collaborative multiplexing communication mode according to an embodiment of the present invention.

Specifically, in another embodiment of the present invention, in a full-duplex mode, a communication process of the collaborative multiplexing communication mode is completed in three slots. FIG. 4 is a schematic diagram of working in another D2D collaborative multiplexing communication mode according to an embodiment of the present invention. In FIG. 4, Da and Db respectively represent first user equipment and second user equipment that perform D2D communication, U1 and U2 represent two third user equipments paired with D2D user equipment, and BS represents a base station. In a first slot, the third user equipment U1 sends data to the neighboring first user equipment Da, and the first user equipment Da and the second user equipment Db send data to each other at the same time. Then, the second user equipment Db considers data of the third user equipment U1 as noise to decode data of the first user equipment Da. The first user equipment Da first decodes data of the second user equipment Db with a relatively strong signal, and then decodes the data of the third user equipment U1 by using SIC technology. In a second slot, the third user equipment U2 sends data to the neighboring second user equipment Db, and the first user equipment Da and the second user equipment Db send data to each other at the same time. The first user equipment Da considers data of the third user equipment U2 as noise to decode data of the second user equipment Db. The second user equipment Db first decodes data of the first user equipment Da with a relatively strong signal, and then decodes the data of the third user equipment U2 by using the SIC technology. In a third slot, when the second user equipment Db sends data to the first user equipment Da, the first user equipment Da sends the data of the third user equipment U1 by using a relatively high power, and sends the data of the first user equipment Da by using a relatively low power. The base station BS considers data of the D2D user equipment as noise to decode the data of the third user equipment U1 and the data of the third user equipment U2. The first user equipment Da first decodes the data of the third user equipment U2, and then decodes the data of the second user equipment Db by using the SIC technology. When the first user equipment Da sends data to the second user equipment Db, the second user equipment Db sends the data of the third user equipment U2 by using a relatively high power, and sends the data of the second user equipment Db by using a relatively low power. The base station BS considers data of the D2D user equipment as noise to decode the data of the third user equipment U1 and the data of the third user equipment U2. The second user equipment Db first decodes the data of the third user equipment U1, and then decodes the data of the first user equipment Da by using the SIC technology, so that the D2D user equipment and uplink user equipment use a same time-frequency resource for collaborative communication in the full-duplex mode.

It can be learned that in the solution of this embodiment of the present invention, the base station sends control signaling to the D2D user equipment and the third user equipment. Then, the first user equipment feeds back, to the base station, the channel quality between the second user equipment and the first user equipment, the second user equipment feeds back, to the base station, the channel quality between the first user equipment and the second user equipment, and the third user equipment feeds back, to the base station, channel quality between the base station and the third user equipment and the channel quality between the D2D user equipment and the third user equipment. Then, the base station determines the D2D communication mode based on channel quality fed back by each user equipment. The D2D communication mode includes the dedicated mode, the common multiplexing mode, and the collaborative multiplexing mode. Therefore, when the D2D communication link is relatively close to the third user equipment, the collaborative multiplexing mode can be selected for D2D communication, to improve time-frequency resource utilization.

Figure 5:
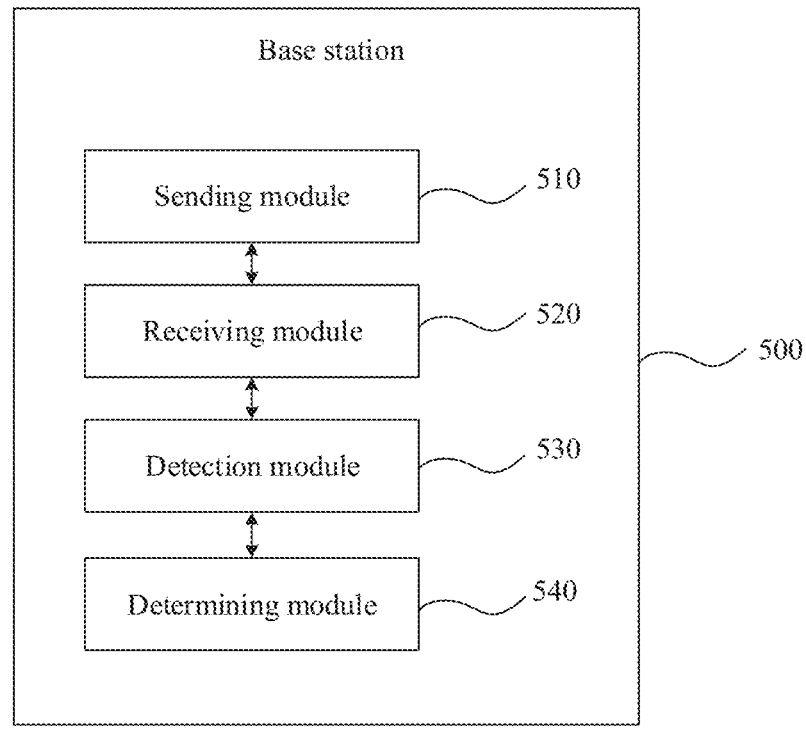
FIG. 5 is a schematic structural diagram of a base station according to an embodiment of the present invention.

FIG. 5 is a schematic structural diagram of a base station 500 according to an embodiment of the present invention. As shown in FIG. 5, the base station 500 includes:

a sending module 510, configured to: send first control signaling to first user equipment, send second control signaling to second user equipment, and send N pieces of third control signaling to N third user equipments, where the first user equipment and the second user equipment are D2D user equipments, and the third user equipment is user equipment in a cell; the first control signaling is used to instruct the first user equipment to detect channel quality between the second user equipment and the first user equipment, the second control signaling is used to instruct the second user equipment to detect channel quality between the first user equipment and the second user equipment, and the third control signaling is used to instruct the third user equipment to detect channel quality between the D2D user equipment and the third user equipment; and N is a positive integer;

a receiving module 520, configured to: receive first channel quality feedback signaling fed back by the first user equipment, receive second channel quality feedback signaling fed back by the second user equipment, and receive N pieces of third channel quality feedback signaling fed back by the N third user equipments, where the first channel quality feedback signaling is used to indicate the channel quality between the second user equipment and the first user equipment, the second channel quality feedback signaling is used to indicate the channel quality between the first user equipment and the second user equipment, and the third channel quality feedback signaling is used to indicate the channel quality between the D2D user equipment and the third user equipment;

a detection module 530, configured to detect channel quality between the D2D user equipment and the base station 500; and a determining module 540, configured to determine a D2D communication mode based on the first channel quality feedback signaling, the second channel quality feedback signaling, the third channel quality feedback signaling, and the channel quality between the D2D user equipment and the base station 500, where the D2D communication mode includes a dedicated mode, a common multiplexing mode, and a collaborative multiplexing mode.

The determining module 540 is further configured to: if the D2D communication mode includes the common multiplexing mode and the collaborative multiplexing mode, determine, based on the first channel quality feedback signaling, the second channel quality feedback signaling, the third channel quality feedback signaling, and the channel quality between the D2D user equipment and the base station 500, target third user equipment paired with the D2D user equipment.

Optionally, in some embodiments of the present invention, the first control signaling includes a first sounding signal sending command, a time-frequency resource allocated by the base station 500 to the first user equipment for sending a first sounding signal, a first sounding signal receiving command, and a time-frequency resource allocated by the base station 500 to the second user equipment for sending a second sounding signal, the first sounding signal sending command is used to instruct the first user equipment to send the first sounding signal on the time-frequency resource allocated by the base station 500 to the first user equipment for sending the first sounding signal, and the first sounding signal receiving command is used to instruct the first user equipment to detect, on the time-frequency resource on which the second user equipment sends the second sounding signal, signal quality of the second sounding signal sent by the second user equipment.

Optionally, in some embodiments of the present invention, the second control signaling includes a second sounding signal sending command, a time-frequency resource allocated by the base station 500 to the second user equipment for sending a second sounding signal, a second sounding signal receiving command, and a time-frequency resource allocated by the base station 500 to the first user equipment for sending a first sounding signal, the second sounding signal sending command is used to instruct the second user equipment to send the second sounding signal on the time-frequency resource allocated by the base station 500 to the second user equipment for sending the second sounding signal, and the second sounding signal receiving command is used to instruct the second user equipment to detect, on the time-frequency resource on which the first user equipment sends the first sounding signal, signal quality of the first sounding signal sent by the first user equipment.

Optionally, in some embodiments of the present invention, the third control signaling includes a third sounding signal receiving command and time-frequency resources allocated by the base station 500 to the first user equipment and the second user equipment, and the third sounding signal receiving command is used to instruct the target third user equipment to detect, on a time-frequency resource of the first user equipment, signal quality of a first sounding signal sent by the first user equipment, and to detect, on a time-frequency resource of the second user equipment, signal quality of a second sounding signal sent by the second user equipment.

Optionally, in some embodiments of the present invention, if the D2D communication mode includes the common multiplexing mode and the collaborative multiplexing mode, the sending module 510 is further configured to: send fourth control signaling to the first user equipment, so that the first user equipment performs communication based on the fourth control signaling; send fifth control signaling to the second user equipment, so that the second user equipment performs communication based on the fifth control signaling; and send sixth control signaling to the target third user equipment, so that the target third user equipment performs communication based on the sixth control signaling. The fourth control signaling includes the D2D communication mode determined by the base station 500, a time-frequency resource allocated by the base station 500 to the first user equipment for receiving and forwarding data, and a transmit power and a modulation and coding scheme that are used when the first user equipment forwards data. The fifth control signaling includes the D2D communication mode determined by the base station 500, a time-frequency resource allocated by the base station 500 to the second user equipment for sending data, and a transmit power and a modulation and coding scheme that are of the second user equipment. The sixth control signaling includes a time-frequency resource allocated by the base station 500 to the target third user equipment for sending data and a transmit power and a modulation and coding scheme that are of the target third user equipment.

It can be learned that in the solution of this embodiment of the present invention, the base station 500 sends control signaling to the D2D user equipment and the third user equipment. Then, the first user equipment feeds back, to the base station 500, the channel quality between the second user equipment and the first user equipment, the second user equipment feeds back, to the base station 500, the channel quality between the first user equipment and the second user equipment, and the third user equipment feeds back, to the base station 500, channel quality between the base station 500 and the third user equipment and the channel quality between the D2D user equipment and the third user equipment. Then, the base station 500 determines the D2D communication mode based on channel quality fed back by each user equipment. The D2D communication mode includes the dedicated mode, the common multiplexing mode, and the collaborative multiplexing mode. Therefore, when a D2D communication link is relatively close to the third user equipment, the collaborative multiplexing mode can be selected for D2D communication, to improve time-frequency resource utilization.

In this embodiment, the base station 500 is presented in a form of a unit. The "unit" herein may be an application-specific integrated circuit (ASIC), a processor and a memory that execute one or more software or firmware programs, an integrated logic circuit, and/or another device that can provide the foregoing functions.

It may be understood that functions of the function units of the base station 500 in this embodiment may be specifically implemented according to the method in the foregoing method embodiment. For a specific implementation process thereof, refer to related descriptions in the foregoing method embodiment. Details are not described herein again.

Figure 6:
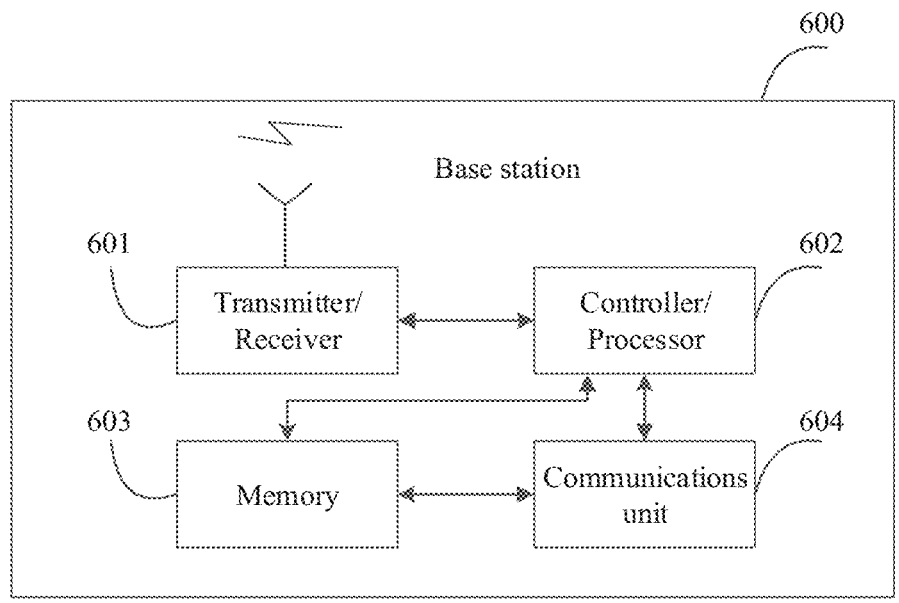
FIG. 6 is a schematic structural diagram of another base station according to an embodiment of the present invention.

FIG. 6 is a schematic structural diagram of another base station 600 according to an embodiment of the present invention. As shown in FIG. 6, the base station 600 includes: a transmitter/receiver 601 and a processor 602. The processor 602 may also be a controller, and is represented as a "controller/processor 602" in FIG. 6. The transmitter/receiver 601 is configured to: support the base station 600 in transmitting/receiving information to/from the first user equipment, the second user equipment, and the third user equipment in the foregoing embodiment, and support the base station 600 in performing radio communication with another base station 600. The processor 602 performs various functions related to the base station 600. In an uplink, an uplink signal from each user equipment is received by using an antenna, is demodulated (for example, a high frequency signal is demodulated into a baseband signal) by the receiver 601, and is further processed by the processor 602 to restore service data and signaling information that are sent by the user equipment. In a downlink, service data and a signaling message are processed by the processor 602, and are modulated (for example, a baseband signal is modulated into a high frequency signal) by the transmitter 601 to generate a downlink signal, and the downlink signal is transmitted to user equipment by using an antenna. It should be noted that the foregoing demodulation or modulation function may also be completed by the processor 602. For example, the processor 602 is further configured to perform corresponding steps in the foregoing method embodiment, and/or another process in the technical solution described in this embodiment of the present invention.

Further, the base station 600 may further include a memory 603. The memory 603 is configured to store program code and data that are of the base station 600. In addition, the base station 600 may further include a communications unit 604. The communications unit 604 is configured to support the base station 600 in communicating with another network entity (for example, each user equipment). For example, in an LTE system, the communications unit 604 may be an S1-U interface, configured to support the base station 600 in communicating with a serving gateway (SGW). Alternatively, the communications unit 604 may be an S1-MME interface, configured to support the base station 600 in communicating with a mobility management entity (MME).

It may be understood that FIG. 6 shows merely a simplified design of the base station 600. In actual application, the base station 600 may include any quantity of transmitters, receivers, processors, controllers, memories, communications units, and the like, and all base stations that can implement the embodiments of the present invention fall within the protection scope of the embodiments of the present invention.

Figure 7:
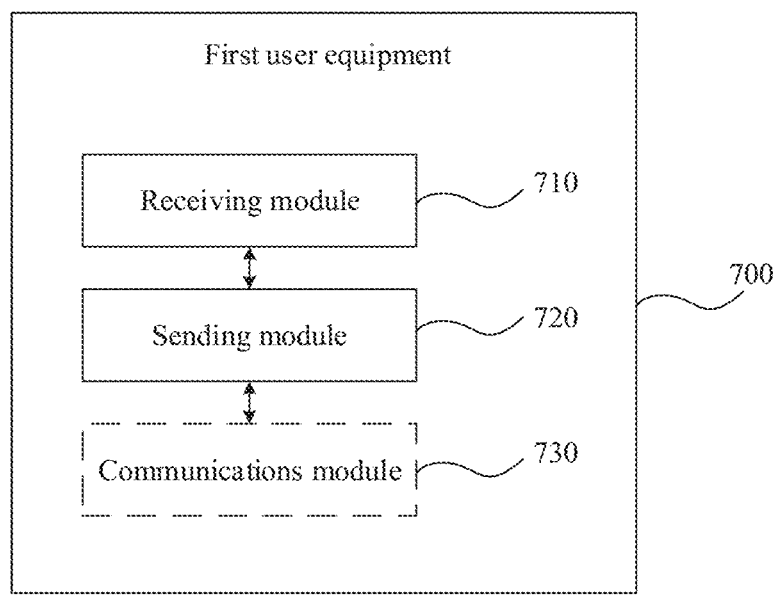
FIG. 7 is a schematic structural diagram of first user equipment according to an embodiment of the present invention.

FIG. 7 is a schematic structural diagram of first user equipment 700 according to an embodiment of the present invention. As shown in FIG. 7, the first user equipment 700 includes:

a receiving module 710, configured to receive first control signaling sent by a base station, where the first control signaling is used to instruct the first user equipment 700 to detect channel quality between the second user equipment and the first user equipment 700, and the first user equipment 700 and the second user equipment are D2D user equipments, where the receiving module 710 is further configured to receive, based on the first control signaling, a second sounding signal sent by the second user equipment, so that the first user equipment 700 detects and obtains the channel quality between the second user equipment and the first user equipment 700, based on the second sounding signal; and a sending module 720, configured to send first channel quality feedback signaling to the base station, where the first channel quality feedback signaling is used to indicate the channel quality between the second user equipment and the first user equipment 700.

Optionally, in some embodiments of the present invention, if the D2D communication mode includes a dedicated mode, a common multiplexing mode, and a collaborative multiplexing mode, the receiving module 710 is further configured to receive fourth control signaling sent by the base station. The fourth control signaling includes a D2D communication mode determined by the base station, a time-frequency resource allocated by the base station to the first user equipment for receiving and forwarding data, and a transmit power and a modulation and coding scheme that are used when the first user equipment forwards data.

The first user equipment further includes a communications module 730, configured to perform communication based on the fourth control signaling.

It can be learned that in the solution of this embodiment of the present invention, the base station sends control signaling to the D2D user equipment and third user equipment. Then, the first user equipment 700 feeds back, to the base station, the channel quality between the second user equipment and the first user equipment 700, the second user equipment feeds back, to the base station, channel quality between the first user equipment 700 and the second user equipment, and the third user equipment feeds back, to the base station, channel quality between the base station and the third user equipment and channel quality between the D2D user equipment and the third user equipment. Then, the base station determines the D2D communication mode based on channel quality fed back by each user equipment. The D2D communication mode includes the dedicated mode, the common multiplexing mode, and the collaborative multiplexing mode. Therefore, when a D2D communication link is relatively close to the third user equipment, the collaborative multiplexing mode can be selected for D2D communication, to improve time-frequency resource utilization.

In this embodiment, the first user equipment 700 is presented in a form of a unit. The "unit" herein may be an application-specific integrated circuit (ASIC), a processor and a memory that execute one or more software or firmware programs, an integrated logic circuit, and/or another device that can provide the foregoing functions.

It may be understood that functions of the function units of the first user equipment 700 in this embodiment may be specifically implemented according to the method in the foregoing method embodiment. For a specific implementation process thereof, refer to related descriptions in the method embodiment. Details are not described herein again.

Figure 8:
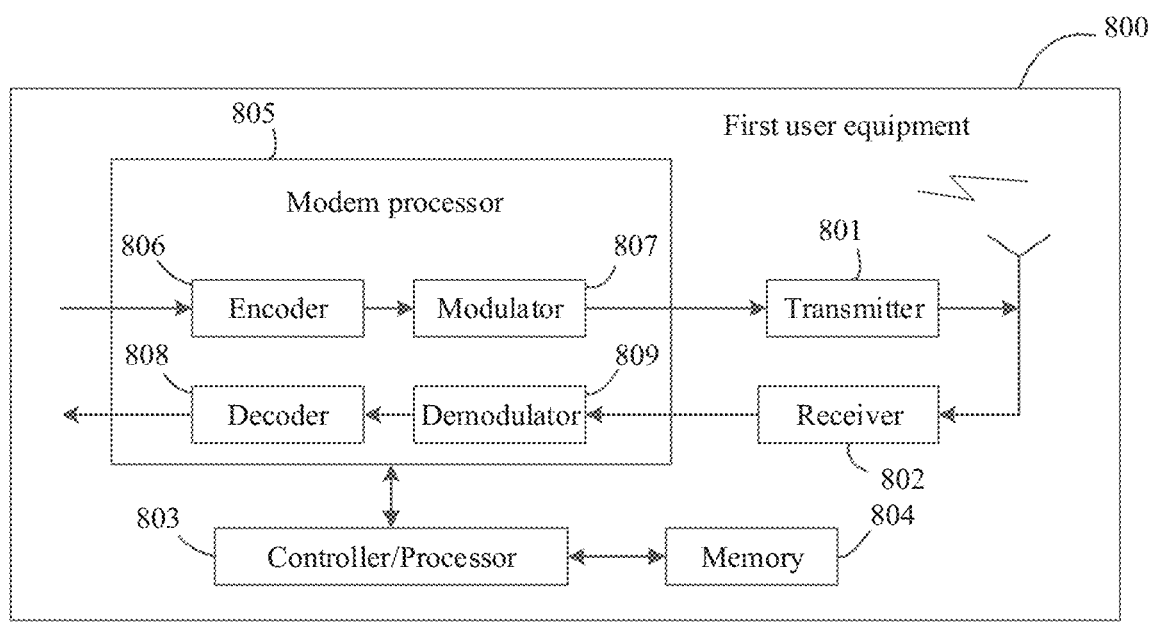
FIG. 8 is a schematic structural diagram of another first user equipment according to an embodiment of the present invention.

FIG. 8 is a schematic structural diagram of another first user equipment 800 according to an embodiment of the present invention. As shown in FIG. 8, the first user equipment 800 includes:

a transmitter 801, a receiver 802, and a processor 803. The processor 803 may also be a controller, and is represented as a "controller/processor 803" in FIG. 8. Optionally, the first user equipment 800 may further include a modem processor 805. The modem processor 805 may include an encoder 806, a modulator 807, a decoder 808, and a demodulator 809.

In an example, the transmitter 801 adjusts (for example, through analog conversion, filtering, amplification, and up-conversion) an output sampling and generates an uplink signal. The uplink signal is transmitted to the base station in the foregoing embodiments by using an antenna. In a downlink, the antenna receives a downlink signal transmitted by the base station in the foregoing embodiments. The receiver 802 adjusts (for example, through filtering, amplification, down-conversion, and digitization) a signal received from the antenna and provides an input sampling. In the modem processor 805, the encoder 806 receives service data and a signaling message that are to be sent in an uplink, and processes (for example, through formatting, coding, and interleaving) the service data and the signaling message. The modulator 807 further processes (for example, through symbol mapping and modulation) coded service data and a coded signaling message, and provides an output sampling. The demodulator 809 processes (for example, through demodulation) the input sampling and provides symbol estimation. The decoder 808 processes (for example, through de-interleaving and decoding) the symbol estimation, and provides decoded data and a decoded signaling message that are to be sent to the first user equipment 800. The encoder 806, the modulator 807, the demodulator 809, and the decoder 808 may be implemented by the combined modem processor 805. These units perform processing based on a radio access technology (for example, an access technology in LTE and another evolved system) used by a radio access network. It should be noted that when the first user equipment 800 does not include the modem processor 805, the foregoing functions of the modem processor 805 may also be implemented by the processor 803.

The processor 803 controls and manages actions of the first user equipment 800, and is configured to perform a processing process performed by the first user equipment 800 in this embodiment of the present invention. For example, the processor 803 is further configured to perform corresponding steps in the foregoing method embodiment, and/or another process in the technical solution described in this application.

Further, the first user equipment 800 may include a memory 804. The memory 804 is configured to store program code and data that are of the first user equipment 800.

Figure 9:
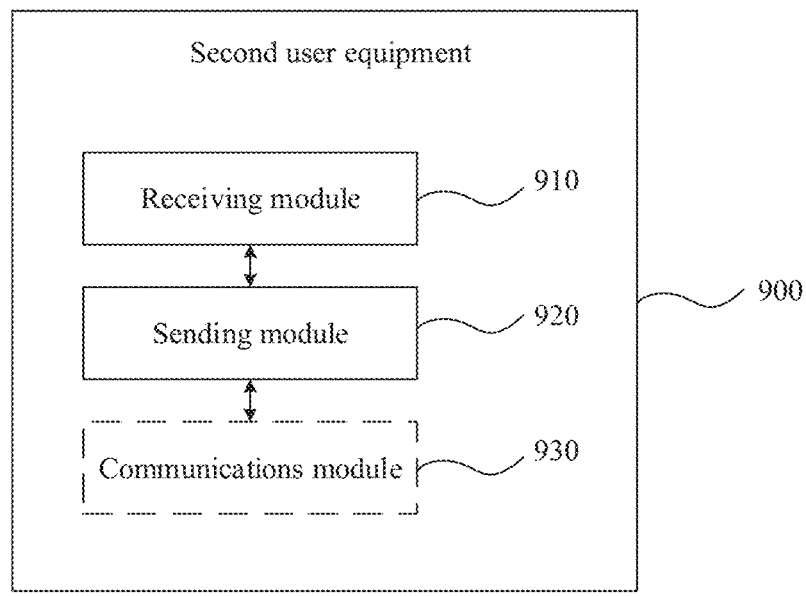
FIG. 9 is a schematic structural diagram of second user equipment according to an embodiment of the present invention.

FIG. 9 is a schematic structural diagram of second user equipment 900 according to an embodiment of the present invention. As shown in FIG. 9, the second user equipment 900 includes:

a receiving module 910, configured to receive second control signaling sent by a base station, where the second control signaling is used to instruct the second user equipment 900 to detect channel quality between the first user equipment and the second user equipment 900, and the first user equipment and the second user equipment 900 are D2D user equipments, where the receiving module 910 is further configured to receive, based on the second control signaling, a first sounding signal sent by the first user equipment, so that the second user equipment 900 detects and obtains the channel quality between the first user equipment and the second user equipment 900, based on the first sounding signal; and a sending module 920, configured to send second channel quality feedback signaling to the base station, where the second channel quality feedback signaling is used to indicate the channel quality between the first user equipment and the second user equipment 900.

Optionally, in an embodiment of the present invention, if the D2D communication mode includes a dedicated mode, a common multiplexing mode, and a collaborative multiplexing mode, the receiving module 910 is further configured to receive fifth control signaling sent by the base station. The fifth control signaling includes a D2D communication mode determined by the base station, a time-frequency resource allocated by the base station to the second user equipment 900 for sending data, and a transmit power and a modulation and coding scheme that are of the second user equipment 900.

The second user equipment 900 further includes a communications module 930, configured to perform communication based on the fifth control signaling.

It can be learned that in the solution of this embodiment of the present invention, the base station sends control signaling to the D2D user equipment and third user equipment. Then, the first user equipment feeds back, to the base station, channel quality between the second user equipment 900 and the first user equipment, the second user equipment 900 feeds back, to the base station, the channel quality between the first user equipment and the second user equipment 900, and the third user equipment feeds back, to the base station, channel quality between the base station and the third user equipment and channel quality between the D2D user equipment and the third user equipment. Then, the base station determines the D2D communication mode based on channel quality fed back by each user equipment. The D2D communication mode includes the dedicated mode, the common multiplexing mode, and the collaborative multiplexing mode. Therefore, when a D2D communication link is relatively close to the third user equipment, the collaborative multiplexing mode can be selected for D2D communication, to improve time-frequency resource utilization.

In this embodiment, the second user equipment 900 is presented in a form of a unit. The "unit" herein may be an application-specific integrated circuit (ASIC), a processor and a memory that execute one or more software or firmware programs, an integrated logic circuit, and/or another device that can provide the foregoing functions.

It may be understood that functions of the function units of the second user equipment 900 in this embodiment may be specifically implemented according to the method in the foregoing method embodiment. For a specific implementation process thereof, refer to related descriptions in the method embodiment. Details are not described herein again.

Figure 10:
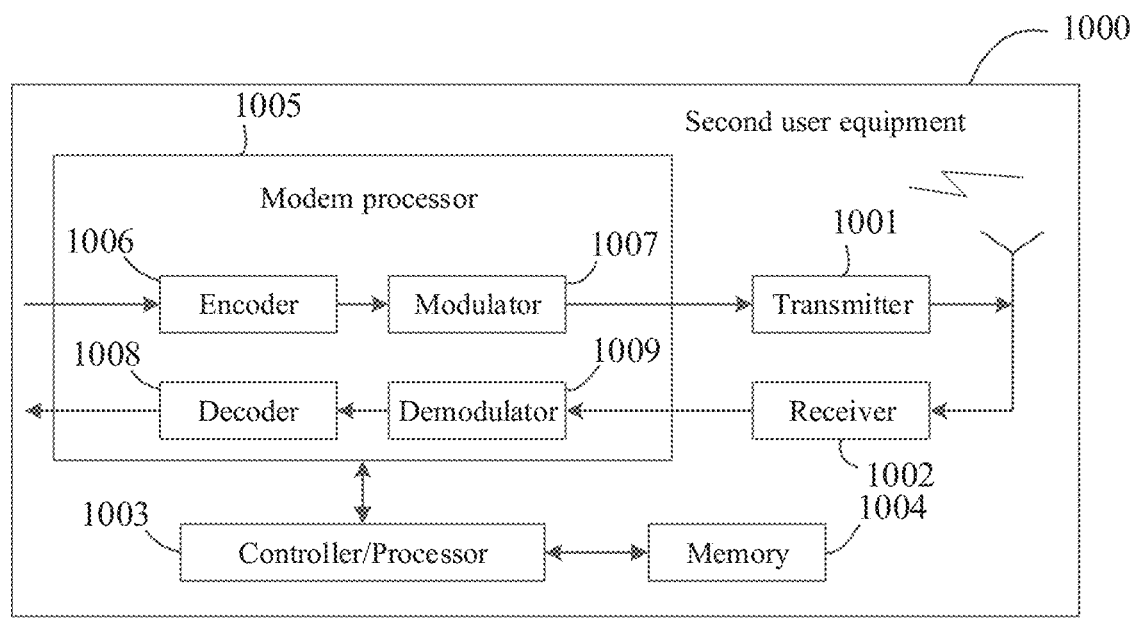
FIG. 10 is a schematic structural diagram of another second user equipment according to an embodiment of the present invention.

FIG. 10 is a schematic structural diagram of another second user equipment 1000 according to an embodiment of the present invention. As shown in FIG. 10, the second user equipment 1000 includes:

a transmitter 1001, a receiver 1002, and a processor 1003. The processor 1003 may also be a controller, and is represented as a "controller/processor 1003" in FIG. 10. Optionally, the second user equipment 1000 may further include a modem processor 1005. The modem processor 1005 may include an encoder 1006, a modulator 1007, a decoder 1008, and a demodulator 1009.

In an example, the transmitter 1001 adjusts (for example, through analog conversion, filtering, amplification, and up-conversion) an output sampling and generates an uplink signal. The uplink signal is transmitted to the base station in the foregoing embodiments by using an antenna. In a downlink, the antenna receives a downlink signal transmitted by the base station in the foregoing embodiments. The receiver 1002 adjusts (for example, through filtering, amplification, down-conversion, and digitization) a signal received from the antenna and provides an input sampling. In the modem processor 1005, the encoder 1006 receives service data and a signaling message that are to be sent in an uplink, and processes (for example, through formatting, coding, and interleaving) the service data and the signaling message. The modulator 1007 further processes (for example, through symbol mapping and modulation) coded service data and a coded signaling message, and provides an output sampling. The demodulator 1009 processes (for example through demodulation) the input sampling and provides symbol estimation. The decoder 1008 processes (for example, through de-interleaving and decoding) the symbol estimation, and provides decoded data and a decoded signaling message that are to be sent to the second user equipment 1000. The encoder 1006, the modulator 1007, the demodulator 1009, and the decoder 1008 may be implemented by the combined modem processor 1005. These units perform processing based on a radio access technology (for example, an access technology in LTE and another evolved system) used by a radio access network. It should be noted that when the second user equipment 1000 does not include the modem processor 1005, the foregoing functions of the modem processor 1005 may also be implemented by the processor 1003.

The processor 1003 controls and manages actions of the second user equipment 1000, and is configured to perform a processing process performed by the second user equipment 1000 in this embodiment of the present invention. For example, the processor 1003 is further configured to perform corresponding steps in the foregoing method embodiment, and/or another process in the technical solution described in this application.

Further, the second user equipment 1000 may include a memory 1004. The memory 1004 is configured to store program code and data that are of the second user equipment 1000.

Figure 11:
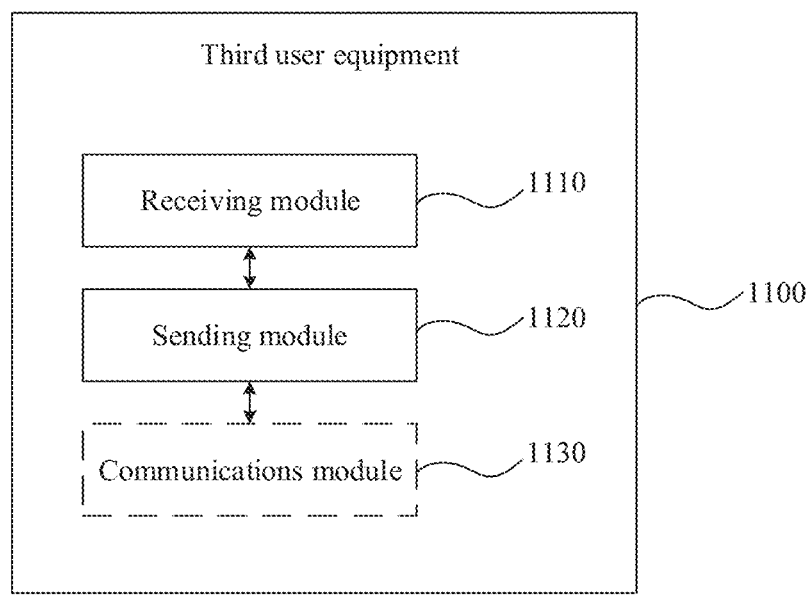
FIG. 11 is a schematic structural diagram of third user equipment according to an embodiment of the present invention.

FIG. 11 is a schematic structural diagram of third user equipment 1100 according to an embodiment of the present invention. As shown in FIG. 11, the third user equipment 1100 includes:

a receiving module 1110, configured to receive third control signaling sent by a base station, where the third user equipment is user equipment in a cell, and the third control signaling is used to instruct the third user equipment to detect channel quality between D2D user equipment and the third user equipment, where the receiving module 1110 is further configured to receive, based on the third control signaling, a first sounding signal sent by first user equipment and a second sounding signal sent by second user equipment, so that the third user equipment detects and obtains the channel quality between the D2D user equipment and the third user equipment, based on the first sounding signal and the second sounding signal; and a sending module 1120, configured to send third channel quality feedback signaling to the base station, where the third channel quality feedback signaling is used to indicate the channel quality between the D2D equipment and the third user equipment.

Optionally, in some embodiments of the present invention, if the D2D communication mode includes a common multiplexing mode and a collaborative multiplexing mode, the receiving module 1110 is further configured to receive sixth control signaling sent by the base station. The sixth control signaling includes a time-frequency resource allocated by the base station to the third user equipment for sending data and a transmit power and a modulation and coding scheme that are of the third user equipment.

The third user equipment further includes a communications module 1130, configured to perform communication based on the sixth control signaling.

It can be learned that in the solution of this embodiment of the present invention, the base station sends control signaling to the D2D user equipment and the third user equipment 1100. Then, the first user equipment feeds back, to the base station, channel quality between the second user equipment and the first user equipment, the second user equipment feeds back, to the base station, channel quality between the first user equipment and the second user equipment, and the third user equipment 1100 feeds back, to the base station, channel quality between the base station and the third user equipment 1100 and the channel quality between the D2D user equipment and the third user equipment 1100. Then, the base station determines a D2D communication mode based on channel quality fed back by each user equipment. The D2D communication mode includes a dedicated mode, the common multiplexing mode, and the collaborative multiplexing mode. Therefore, when a D2D communication link is relatively close to the third user equipment 1100, the collaborative multiplexing mode can be selected for D2D communication, to improve time-frequency resource utilization.

In this embodiment, the third user equipment 1100 is presented in a form of a unit. The "unit" herein may be an application-specific integrated circuit (ASIC), a processor and a memory that execute one or more software or firmware programs, an integrated logic circuit, and/or another device that can provide the foregoing functions.

It may be understood that functions of the function units of the third user equipment 1100 in this embodiment may be specifically implemented according to the method in the foregoing method embodiment. For a specific implementation process thereof, refer to related descriptions in the foregoing method embodiment. Details are not described herein again.

Figure 12:
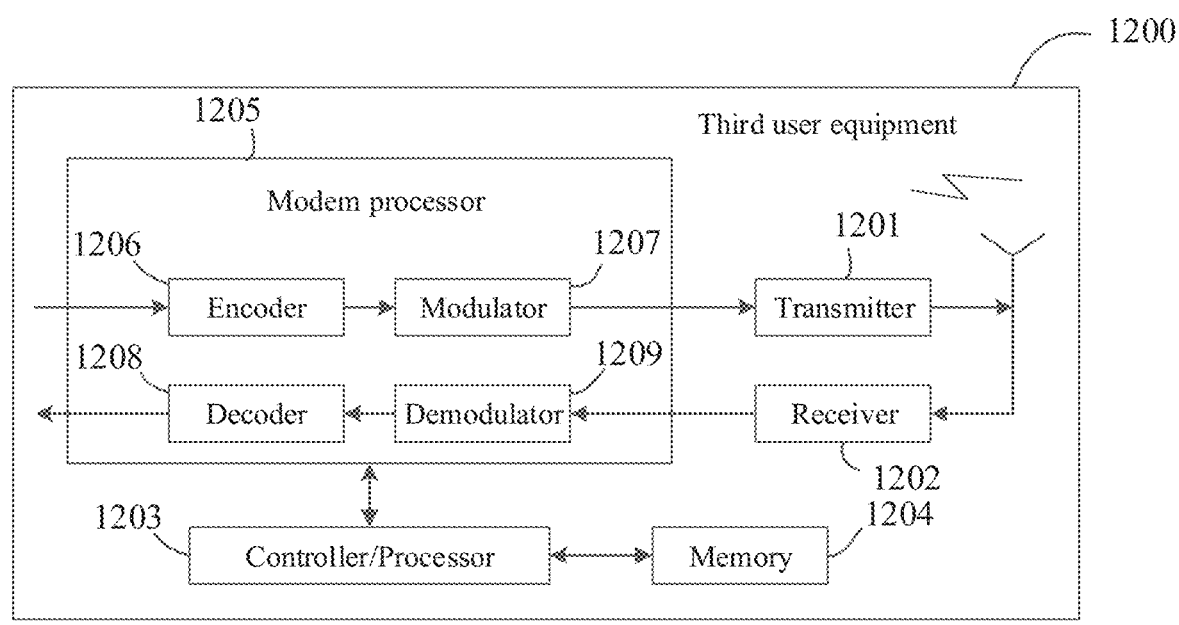
FIG. 12 is a schematic structural diagram of another third user equipment according to an embodiment of the present invention.

FIG. 12 is a schematic structural diagram of another third user equipment 1200 according to an embodiment of the present invention. As shown in FIG. 12, the third user equipment 1200 includes:

a transmitter 1201, a receiver 1202, and a processor 1203. The processor 1203 may also be a controller, and is represented as a "controller/processor 1203" in FIG. 12. Optionally, the third user equipment 1200 may further include a modem processor 1205. The modem processor 1205 may include an encoder 1206, a modulator 1207, a decoder 1208, and a demodulator 1209.

In an example, the transmitter 1201 adjusts (for example, through analog conversion, filtering, amplification, and up-conversion) an output sampling and generates an uplink signal. The uplink signal is transmitted to the base station in the foregoing embodiments by using an antenna. In a downlink, the antenna receives a downlink signal transmitted by the base station in the foregoing embodiments. The receiver 1202 adjusts example, through filtering, amplification, down-conversion, and digitization) a signal received from the antenna and provides an input sampling. In the modem processor 1205, the encoder 1206 receives service data and a signaling message that are to be sent in an uplink, and processes (for example, through formatting, coding, and interleaving) the service data and the signaling message. The modulator 1207 further processes (for example, through symbol mapping and modulation) coded service data and a coded signaling message, and provides an output sampling. The demodulator 1209 processes (for example, through demodulating) the input sampling and provides symbol estimation. The decoder 1208 processes (for example, through de-interleaving and decoding) the symbol estimation, and provides decoded data and a decoded signaling message that are to be sent to the third user equipment 1200. The encoder 1206, the modulator 1207, the demodulator 1209, and the decoder 1208 may be implemented by the combined modem processor 1205. These units perform processing based on a radio access technology (for example, an access technology in LTE and another evolved system) used by a radio access network. It should be noted that when the third user equipment 1200 does not include the modem processor 1205, the foregoing functions of the modem processor 1205 may also be implemented by the processor 1203.

The processor 1203 controls and manages actions of the third user equipment 1200, and is configured to perform a processing process performed by the third user equipment 1200 in this embodiment of the present invention. For example, the processor 1203 is further configured to perform corresponding steps in the foregoing method embodiment, and/or another process in the technical solution described in this application.

Further, the third user equipment 1200 may further include a memory 1204. The memory 1204 is configured to store program code and data that are of the third user equipment 200.

An embodiment of the present invention further provides a computer readable storage medium. The computer readable storage medium may store a program. When the program is executed, some or all of the steps of any D2D communication method recorded in the foregoing method embodiments may be implemented. The foregoing storage medium includes any medium that can store program code, such as a USB flash drive, a read-only memory (ROM), a random access memory (RAM), a removable hard disk, a magnetic disk, or an optical disc.

It should be noted that for ease of description, the foregoing method embodiments are expressed as a combination of a series of actions. However, persons skilled in the art should appreciate that the present invention is not limited to the described action sequence, because according to the present invention, some steps may be performed in other sequences or simultaneously. In addition, persons skilled in the art should also appreciate that all the embodiments described in the specification are embodiments, and the related actions and modules are not necessarily mandatory to the present invention.

In the foregoing embodiments, the descriptions of the embodiments have respective focuses. For a part that is not described in detail in an embodiment, refer to related descriptions in other embodiments.

In the several embodiments provided in this application, it should be understood that the disclosed apparatus may be implemented in another manner. For example, the foregoing described apparatus embodiment is merely an example. For example, the unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions recorded in the foregoing embodiments or make equivalent replacements to some technical features thereof, without departing from the scope of the technical solutions of the embodiments of the present invention.

What is claimed is:

1. A device-to-device ("D2D") communication method, the method comprising:

sending first control signaling to first user equipment;

sending second control signaling to second user equipment;

sending N pieces of third control signaling to N third user equipment, wherein the first user equipment is D2D user equipment, the second user equipment is D2D user equipment, the third user equipment is user equipment in a cell, the first control signaling instructs the first user equipment to detect channel quality between the second user equipment and the first user equipment, the second control signaling instructs the second user equipment to detect channel quality between the first user equipment and the second user equipment, and the third control signaling instructs the third user equipment to detect channel quality between the D2D user equipment and the third user equipment, where N is a positive integer;

receiving first channel quality feedback signaling fed back by the first user equipment;

receiving second channel quality feedback signaling fed back by the second user equipment;

receiving N pieces of third channel quality feedback signaling fed back by the N third user equipment, wherein the first channel quality feedback signaling indicates the channel quality between the second user equipment and the first user equipment, the second channel quality feedback signaling indicates the channel quality between the first user equipment and the second user equipment, and the third channel quality feedback signaling indicates the channel quality between the D2D user equipment and the third user equipment;

detecting, by a base station comprising a processor, channel quality between the D2D user equipment and the base station;

determining a D2D communication mode based on the first channel quality feedback signaling, the second channel quality feedback signaling, the third channel quality feedback signaling, and the channel quality between the D2D user equipment and the base station, wherein the D2D communication mode comprises one or more of a dedicated mode, a common multiplexing mode or a collaborative multiplexing mode; and based on a determination that the D2D communication mode comprises the common multiplexing mode and the collaborative multiplexing mode, determining, based on the first channel quality feedback signaling, the second channel quality feedback signaling, the third channel quality feedback signaling, and the channel quality between the D2D user equipment and the base station, target third user equipment of the N third user equipment paired with the D2D user equipment.

2. The method according to claim 1, wherein
the first control signaling comprises a first sounding signal sending command, a time-frequency resource allocated to the first user equipment for sending a first sounding signal, a first sounding signal receiving command, and a time-frequency resource allocated to the second user equipment for sending a second sounding signal,
the first sounding signal sending command instructs the first user equipment to send the first sounding signal on the time-frequency resource allocated to the first user equipment for sending the first sounding signal, and
the first sounding signal receiving command instructs the first user equipment to detect, on the time-frequency resource on which the second user equipment sends the second sounding signal, signal quality of the second sounding signal sent by the second user equipment.

3. The method according to claim 1, wherein
the second control signaling comprises a second sounding signal sending command, a time-frequency resource allocated to the second user equipment for sending a second sounding signal, a second sounding signal receiving command, and a time-frequency resource allocated to the first user equipment for sending a first sounding signal,
the second sounding signal sending command instructs the second user equipment to send the second sounding signal on the time-frequency resource allocated to the second user equipment for sending the second sounding signal, and
the second sounding signal receiving command instructs the second user equipment to detect, on the time-frequency resource on which the first user equipment sends the first sounding signal, signal quality of the first sounding signal sent by the first user equipment.

4. The method according to claim 1, wherein
the third control signaling comprises a third sounding signal receiving command and time-frequency resources allocated to the first user equipment and the second user equipment, and
the third sounding signal receiving command instructs the target third user equipment to detect, on a time-frequency resource of the first user equipment, signal quality of a first sounding signal sent by the first user equipment, and to detect, on a time-frequency resource of the second user equipment, signal quality of a second sounding signal sent by the second user equipment.

5. The method according to claim 1, wherein based on a determination that the D2D communication mode comprises the common multiplexing mode and the collaborative multiplexing mode, the method further comprises:
sending fourth control signaling to the first user equipment to cause the first user equipment to perform a communication based on the fourth control signaling;
sending fifth control signaling to the second user equipment to cause the second user equipment to perform a communication based on the fifth control signaling; and
sending sixth control signaling to the target third user equipment to cause the target third user equipment to perform a communication based on the sixth control signaling,
wherein
the fourth control signaling comprises the determined D2D communication mode, a time-frequency resource allocated to the first user equipment for receiving and forwarding data, and a transmit power and a modulation and coding scheme that are used when the first user equipment forwards data,
the fifth control signaling comprises the determined D2D communication mode, a time-frequency resource allocated to the second user equipment for sending data, and a transmit power and a modulation and coding scheme that are associated with the second user equipment, and
the sixth control signaling comprises a time-frequency resource allocated to the target third user equipment for sending data and a transmit power and a modulation and coding scheme that associated with the target third user equipment.

6. A device-to-device ("D2D") communication method, comprising:
receiving first control signaling from a base, station comprising a processor, wherein the first control signaling indicates first user equipment to detect channel quality between second user equipment and the first user equipment, and the first user equipment is D2D user equipment, and the second user equipment is D2D user equipment;
receiving a sounding signal from the second user equipment based on the first control signaling, to detect and obtain the channel quality between the second user equipment and the first user equipment, based on the sounding signal; and sending first channel quality feedback signaling to the base station, wherein the first channel quality feedback signaling indicates the channel quality between the second user equipment and the first user equipment.

7. The method according to claim 6, wherein based on a determination that a communication mode comprises a dedicated mode, a common multiplexing mode, and a collaborative multiplexing mode, the method further comprises:

receiving fourth control signaling from the base station, wherein the fourth control signaling comprises a determined D2D communication mode, a time-frequency resource allocated to the first user equipment for receiving and forwarding data, and a transmit power and a modulation and coding scheme that are used when the first user equipment forwards data; and performing communication based on the fourth control signaling.

8. An apparatus, comprising:
a processor; and
a memory having computer readable instructions stored thereon that, when executed by the processor, cause the apparatus to:
send first control signaling to first user equipment;
send second control signaling to second user equipment;
send N pieces of third control signaling to N third user equipment; wherein the first user equipment is D2D user equipment, the second user equipment is D2D user equipment, the third user equipment is user equipment in a cell, the first control signaling instructs the first user equipment to detect channel quality between the second user equipment and the first user equipment, the second control signaling instructs the second user equipment to detect channel quality between the first user equipment and the second user equipment, and the third control signaling instructs the third user equipment to detect channel quality between the D2D user equipment and the third user equipment, where N is a positive integer;
receive first channel quality feedback signaling fed back by the first user equipment;
receive second channel quality feedback signaling fed back by the second user equipment,
receive N pieces of third channel quality feedback signaling fed back by the N third user equipment, wherein the first channel quality feedback signaling indicates the channel quality between the second user equipment and the first user equipment, the second channel quality feedback signaling indicates the channel quality between the first user equipment and the second user equipment, and the third channel quality feedback signaling indicates the channel quality between the D2D user equipment and the third user equipment;
detect channel quality between the D2D user equipment and a base station;
determine a D2D communication mode based on the first channel quality feedback signaling, the second channel quality feedback signaling, the third channel quality feedback signaling, and the channel quality between the D2D user equipment and the base station, wherein the D2D communication mode comprises one or more of a dedicated mode, a common multiplexing mode or a collaborative multiplexing mode; and based on a determination that the D2D communication mode comprises the common multiplexing mode and the collaborative multiplexing mode, determine, based on the first channel quality feedback signaling, the second channel quality feedback signaling, the third channel quality feedback signaling, and the channel quality between the D2D user equipment and the base station, target third user equipment of the N third user equipment paired with the D2D user equipment.

9. The apparatus according to claim 8, wherein
the first control signaling comprises a first sounding signal sending command, a time-frequency resource allocated to the first user equipment for sending a first sounding signal, a first sounding signal receiving command, and a time-frequency resource allocated to the second user equipment for sending a second sounding signal, the first sounding signal sending command instructs the first user equipment to send the first sounding signal on the time-frequency resource allocated to the first user equipment for sending the first sounding signal, and the first sounding signal receiving command instructs the first user equipment to detect, on the time-frequency resource on which the second user equipment sends the second sounding signal, signal quality of the second sounding signal sent by the second user equipment.

10. The apparatus according to claim 8, wherein
the second control signaling comprises a second sounding signal sending command, a time-frequency resource allocated to the second user equipment for sending a second sounding signal, a second sounding signal receiving command, and a time-frequency resource allocated to the first user equipment for sending a first sounding signal, the second sounding signal sending command instructs the second user equipment to send the second sounding signal on the time-frequency resource allocated to the second user equipment for sending the second sounding signal, and the second sounding signal receiving command instructs the second user equipment to detect, on the time-frequency resource on which the first user equipment sends the first sounding signal, signal quality of the first sounding signal sent by the first user equipment.

11. The apparatus according to claim 8, wherein
the third control signaling comprises a third sounding signal receiving command and time-frequency resources allocated to the first user equipment and the second user equipment, and the third sounding signal receiving command instructs the target third user equipment to detect, on a time-frequency resource of the first user equipment, signal quality of a first sounding signal sent by the first user equipment, and to detect, on a time-frequency resource of the second user equipment, signal quality of a second sounding signal sent by the second user equipment.

12. The apparatus according to claim 8, wherein based on a determination that the D2D communication mode comprises the common multiplexing mode and the collaborative multiplexing mode, the apparatus is further caused to:

send fourth control signaling to the first user equipment to cause the first user equipment to perform a communication based on the fourth control signaling;

send fifth control signaling to the second user equipment to cause the second user equipment to perform a communication based on the fifth control signaling; and send sixth control signaling to the target third user equipment to cause the target third user equipment to perform a communication based on the sixth control signaling,
wherein
the fourth control signaling comprises the determined D2D communication mode, a time-frequency resource allocated to the first user equipment for receiving and forwarding data, and a transmit power and a modulation and coding scheme that are used when the first user equipment forwards data,
the fifth control signaling comprises the determined D2D communication mode, a time-frequency resource allocated to the second user equipment for sending data, and a transmit power and a modulation and coding scheme that are associated with the second user equipment, and
the sixth control signaling comprises a time-frequency resource allocated to the target third user equipment for sending data and a transmit power and a modulation and coding scheme that associated with the target third user equipment.

* * * * *